(12) United States Patent
Fang

(10) Patent No.: US 12,167,149 B2
(45) Date of Patent: Dec. 10, 2024

(54) METHOD FOR MULTI-SENSOR WHITE BALANCE SYNCHRONIZATION AND ELECTRONIC DEVICE USING THE SAME

(71) Applicant: SAMSUNG ELECTRONICS CO., LTD., Suwon-si (KR)

(72) Inventor: Jingyu Fang, Xi'an (CN)

(73) Assignee: Samsung Electronics Co., Ltd. (KR)

( * ) Notice: Subject to any disclaimer, the term of this patent is extended or adjusted under 35 U.S.C. 154(b) by 241 days.

(21) Appl. No.: 17/827,840

(22) Filed: May 30, 2022

(65) Prior Publication Data

US 2023/0292014 A1 Sep. 14, 2023

(30) Foreign Application Priority Data

Mar. 8, 2022 (CN) .......................... 202210219628.5

(51) Int. Cl.
*H04N 23/88* (2023.01)

(52) U.S. Cl.
CPC .................................. *H04N 23/88* (2023.01)

(58) Field of Classification Search
CPC ............................. H04N 23/88; H04N 23/13
See application file for complete search history.

(56) References Cited

U.S. PATENT DOCUMENTS

| | | | |
|---|---|---|---|
| 9,106,879 B2 | 8/2015 | Jiang et al. | |
| 9,247,223 B2 | 1/2016 | Mccrackin et al. | |
| 9,258,539 B2 | 2/2016 | Kim | |
| 9,307,215 B1 | 4/2016 | Liu et al. | |
| 9,686,523 B2 | 6/2017 | Kim et al. | |
| 10,630,954 B2 | 4/2020 | Krestyannikov et al. | |
| 2010/0149372 A1* | 6/2010 | Silverstein | H04N 23/88 382/167 |
| 2013/0083216 A1* | 4/2013 | Jiang | H04N 23/88 348/E9.051 |
| 2014/0009683 A1* | 1/2014 | Yoshida | H04N 23/88 348/655 |

(Continued)

FOREIGN PATENT DOCUMENTS

| | | |
|---|---|---|
| CN | 106231279 | 12/2016 |
| CN | 108965835 | 12/2018 |

(Continued)

OTHER PUBLICATIONS

Office Action in Chinese Appln. No. 202210219628.5, mailed on Jan. 25, 2024, 11 pages (with English translation).

*Primary Examiner* — Abdelaaziz Tissire
(74) *Attorney, Agent, or Firm* — Fish & Richardson P.C.

(57) ABSTRACT

A method of multi-sensor white balance synchronization, and an electronic device using the same, including sensing a same scene by a plurality of sensors of an imaging system to obtain and provide outputs of the plurality of sensors; obtaining color information of the plurality of sensors and color statistical information of the plurality of sensors from the outputs of the plurality of sensors; merging the color information of the plurality of sensors based on the color statistical information of the plurality of sensors, to obtain global color information; calculating white balance gain coefficients of each of the plurality of sensors using the global color information; and generating an image having adjusted white balance based on the outputs of the plurality of sensors and the white balance gain coefficients.

17 Claims, 4 Drawing Sheets

(56) References Cited

U.S. PATENT DOCUMENTS

| | | | |
|---|---|---|---|
| 2015/0116534 A1* | 4/2015 | Kim | H04N 25/134 |
| | | | 348/223.1 |
| 2016/0182874 A1* | 6/2016 | Richards | H04N 23/90 |
| | | | 348/187 |
| 2017/0289446 A1* | 10/2017 | Gomes Leandro | H04N 23/88 |
| 2019/0045161 A1* | 2/2019 | Krestyannikov | G06T 7/90 |
| 2021/0105448 A1 | 4/2021 | Nikhara et al. | |
| 2022/0078324 A1* | 3/2022 | Yu | H04N 23/72 |
| 2023/0033857 A1* | 2/2023 | Jang | G06T 1/00 |
| 2023/0199331 A1* | 6/2023 | Lai | H04N 1/6077 |
| | | | 348/223.1 |

FOREIGN PATENT DOCUMENTS

| | | |
|---|---|---|
| CN | 112655193 | 4/2021 |
| CN | 112689140 | 4/2021 |
| CN | 113766206 | 12/2021 |
| JP | 2007-053499 | 3/2007 |
| KR | 10-1663620 | 10/2016 |
| KR | 10-1867568 | 6/2018 |

* cited by examiner

METHOD FOR MULTI-SENSOR WHITE BALANCE SYNCHRONIZATION AND ELECTRONIC DEVICE USING THE SAME

BACKGROUND

The present disclosure relates to automatic white balance (AWB) synchronization, and more particularly to methods of automatic white balance synchronization of an imaging system including a plurality of sensors, and/or electronic devices using the same.

In an imaging system having a plurality of sensors, it is necessary to consider the white balance difference among the plurality of sensors. A current method of multi-sensor white balance synchronization includes selecting a sensor (e.g., a main camera) as a reference sensor, and performing a white balance algorithm based on an image captured by the reference sensor, to obtain color information under a current capturing condition (e.g., color temperature). Then, white balance gain coefficients of the plurality of sensors are obtained according to calibration characteristics between the reference sensor and other sensors based on the color information, so as to ensure that white balance effects of different sensors are consistent.

However, the color information obtained from the reference sensor may not be accurate. In some cases, not enough information for automatic white balance calculation may be obtained by only using the reference sensor. There is thus a need for improved multi-sensor white balance synchronization technology.

SUMMARY

Embodiments of the inventive concepts provide a method for multi-sensor white balance synchronization including sensing a same scene by a plurality of sensors of an imaging system to obtain and provide outputs of the plurality of sensors; obtaining, by a processor, color information of the plurality of sensors and color statistical information of the plurality of sensors from the outputs of the plurality of sensors; merging, by the processor, the color information of the plurality of sensors based on the color statistical information of the plurality of sensors, to obtain global color information; calculating, by the processor, white balance gain coefficients of each of the plurality of sensors using the global color information; and generating, by the processor, an image having adjusted white balance based on the outputs of the plurality of sensors and the white balance gain coefficients.

Embodiments of the inventive concepts further provide an electronic device including a plurality of sensors that sense a same scene to obtain and provide a plurality of sensor outputs; and a processor that obtains color information of the plurality of sensors and color statistical information of the plurality of sensors based on the plurality of sensor outputs, merges the color information of the plurality of sensors based on the color statistical information of the plurality of sensors to obtain global color information, determines white balance gain coefficients of each of the plurality of sensors using the global color information, and generates an image having adjusted white balance based on the plurality of sensor outputs and the white balance gain coefficients.

Embodiments of the inventive concepts still further provide a non-transitory computer-readable storage medium for storing instructions executable by a processor for controlling an electronic device including a plurality of sensors and the processor, the plurality of sensors sense a same scene to obtain and provide a plurality of sensor outputs, the non-transitory computer-readable storage medium including a first instruction for obtaining color information of the plurality of sensors and color statistical information of the plurality of sensors based on the plurality of sensor outputs; a second instruction for merging the color information of the plurality of sensors based on the color statistical information of the plurality of sensors to obtain global color information; a third instruction for determining white balance gain coefficients of each of the plurality of sensors using the global color information; and a fourth instruction for generating an image having adjusted white balance based on the plurality of sensors and the white balance gain coefficients.

The method for multi-sensor white balance synchronization and the electronic device according to some example embodiments of inventive concepts may have an effect of more accurate white balance synchronization.

BRIEF DESCRIPTION OF THE DRAWINGS

The above and other objects, features and advantages will be more clearly understood from the following detailed description together with the accompanying drawings in which.

DETAILED DESCRIPTION

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
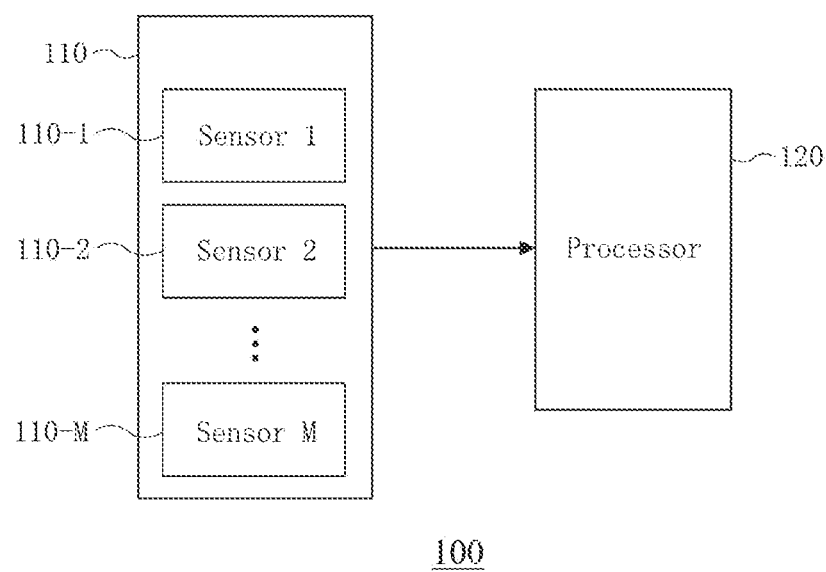
FIG. 1 illustrates a block diagram of an electronic device according to embodiments of the inventive concepts.

FIG. 1 illustrates a block diagram of an electronic device 100 according to e embodiments of the inventive concepts.

The electronic device according to some embodiments may be or include for example a camera, a smart cellphone, a tablet personal computer (PC), a personal digital assistant (PDA), a portable multimedia player (PMP), an augmented reality (AR) device, a virtual reality (VR) device, various wearable devices (e.g., a smart watch, smart glasses, a smart bracelet, etc.), and the like. However, embodiments of the inventive concepts are not limited to these electronic devices, and other embodiments may include any electronic devices having an image capture function.

As shown in FIG. 1, the electronic device 100 according to embodiments of the inventive concepts includes at least a sensor unit (e.g., circuit) 110 and a processor 120.

The sensor unit 110 may include a plurality of sensors, for example sensor 1, sensor 2, . . . , and sensor M respectively denoted as sensors 110-1, 110-2, . . . , and 110-M. M may be an integer greater than one. In some embodiments, the plurality of sensors may include different types of sensors. For example, the sensor 110-1 may be an image sensor for capturing images, and the sensor 110-2 may be a color sensor.

The output of an image sensor may be an image. The plurality of sensors may also include one or more color sensors. The color sensors may detect and output one or more of correlated color temperature (CCT), brightness, illuminance, and spectral power distribution (SPD) according to its specific type. For example, when the color sensor is a color temperature sensor, its output is the color temperature of the environment.

The processor 120 may process the output of the sensor unit 110, so as to perform image processing such as a white balance synchronization operation.

When a same scene is sensed by the plurality of sensors 110-1 to 110-M of the sensor unit 110 of the electronic device 100, the processor 120 may receive outputs of the plurality of sensors; obtain color information of each sensor and color statistical information of each sensor from the outputs of the plurality of sensors; merge the color information of the plurality of sensors based on the color statistical information of the plurality of sensors, to obtain global color information; and calculate the white balance gain coefficient of each of the plurality of sensors using the global color information.

The processor 120 may be implemented as hardware such as for example a general-purpose processor, an application processor (AP), an integrated circuit dedicated to image processing, a field programmable gate array, or a combination of hardware and software.

In some example embodiments, the electronic device 100 may also include a memory (not shown). The memory may store data and/or software for implementing the method for multi-sensor white balance synchronization according to some example embodiments. When the processor 120 executes the software, the method for multi-sensor white balance synchronization according to some example embodiments may be implemented. The memory may be implemented as part of processor 120, or as separate from processor 120 within electronic device 100.

The method for multi-sensor white balance synchronization according to some example embodiments is hereinafter described in connection with FIG. 2.

Figure 2:
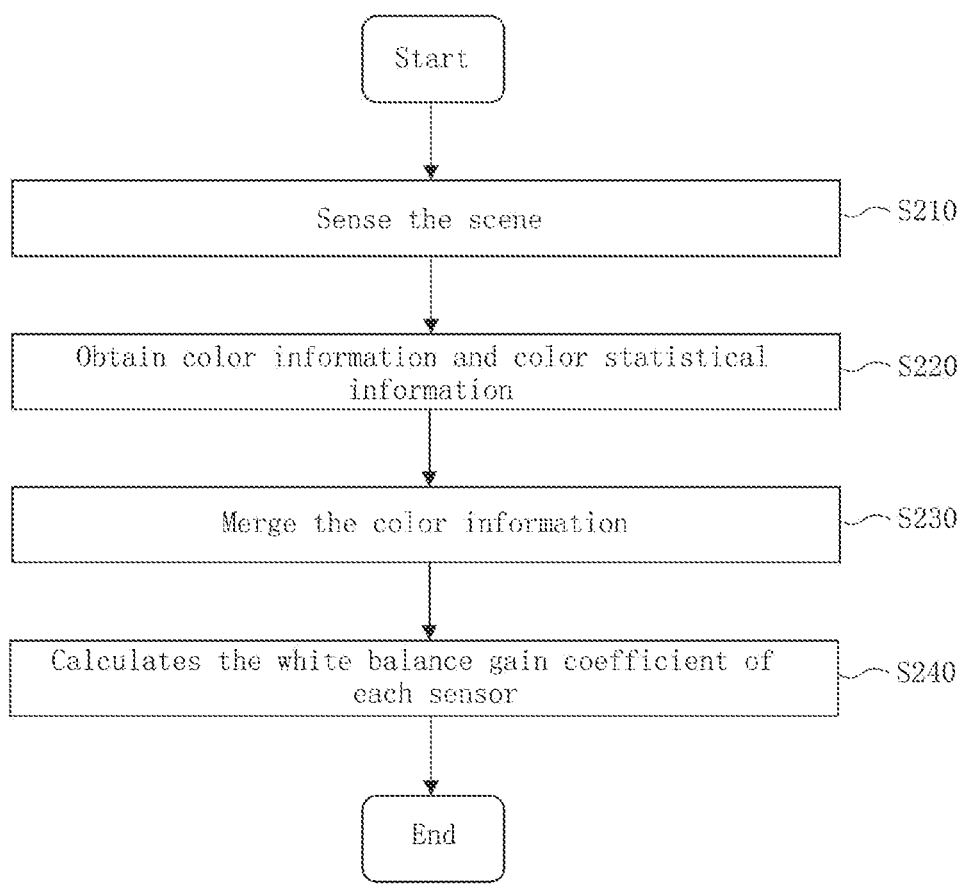
FIG. 2 illustrates a flowchart descriptive of a method of multi-sensor white balance synchronization according to embodiments of the inventive concepts.

FIG. 2 illustrates a flowchart descriptive of a method of multi-sensor white balance synchronization according to embodiments of the inventive concepts. The description of the method of white balance synchronization as follows is made with reference to the electronic device 100 of FIG. 1, but may be applied to electronic devices of various other configurations. Although FIG. 2 illustrates various steps, an order of the steps is not necessarily limited to the order presented in FIG. 2.

Referring to FIG. 2, in step S210 a same scene is sensed by the plurality of sensors 110-1 to 110-M of the sensor unit 110. The processor 120 receives outputs of the plurality of sensors of the sensor unit 110.

In step S220, the processor 120 obtains the color information of each sensor and the color statistical information of each sensor from the outputs of the plurality of sensors 110-1 to 110-M.

The color information may indicate the actual light environment of the captured scene, and may be any color-related information used in subsequent white balance calculation. In some example embodiments, the color information may for example be at least one of correlated color temperature, brightness, illuminance, spectral power distribution, and the like.

The types of color information respectively obtained from the outputs of the plurality of sensors are the same. For example, when correlated color temperature is used for white balance calculation, the correlated color temperature of each sensor is obtained from the output of each sensor.

For image sensors, the color information may be calculated based on the output image. In some example embodiments, the color information may be calculated for example based on the pixel value of the output image, shooting setting parameters (for example, ISO, aperture, and/or shutter time, etc.), etc. However, embodiments of the inventive concepts are not limited thereto, and any other method of obtaining color information from the output of an image sensor may also be used.

The output of the color sensor may be used as color information. In some example embodiments, the color information may also be calculated based on the output of the color sensor.

The color information may be a one-dimensional vector or a multi-dimensional vector, depending on the type of parameters required by the automatic white balance algorithm specifically used by the processor 120 of the electronic device. For example, when two different types of color information (for example, correlated color temperature and illuminance) are used for white balance calculation, the correlated color temperature and illuminance are obtained respectively from the output of each sensor, as the color information vector.

The color statistical information may reflect the sensing accuracy or confidence of the corresponding sensor. In some example embodiments, the color statistical information may be represented by variance. In this case, when the color information is a one-dimensional vector, the color statistical information may be the variance of the color information, and when the color information is a multi-dimensional vector, the color statistical information may be a covariance matrix. However, the inventive concepts are not limited thereto, and the color statistical information may be other statistical parameters that may reflect the sensing accuracy or confidence of the corresponding sensor.

The calculation of color statistical information may be based on training of actual data or simulated data. For example, when the color statistical information is the variance, the color statistical information may be calculated based on the image information of the image sensor (for example, information entropy) or the output information of the color sensor (for example, correlated color temperature, brightness, spectral power distribution, and/or illuminance, etc.). The color statistical information may also be determined by the manufacturer of the sensor.

In some example embodiments, the processor 120 may obtain color information and color statistical information of the image sensor, from the output of the image sensor, and may obtain corresponding color information and color statistical information from the output of the color sensor.

In step S230, the processor 120 merges the color information of the plurality of sensors based on the color statistical information of the plurality of sensors, to obtain global color information. The global color information may be considered as an optimal estimate of the color information under the current light environment.

In some example embodiments, the processor 120 may perform a weighted summation on the color information of the plurality of sensors based on the color statistical information of the plurality of sensors, to obtain the global color information.

In some example embodiments in which the color information is a one-dimensional vector, the global color information may be calculated based on equation (1) as follows:

$$x = \sum_{i=1}^{M}(x_i \times \omega_i). \quad (1)$$

In equation (1), $x_i$ may represent a color information value of an i-th sensor among the plurality of sensors, $\omega_i$ may represent a weight for the color information $x_i$ of the i-th sensor, x may represent the global color information, and M may represent the number of the sensors.

In some example embodiments, the weight for the color information of each sensor may be inversely proportional to the color statistical information of the corresponding color information, and directly proportional to the merged color statistical information. The merged color statistical information may represent the merged value of the color statistical information of the plurality of sensors.

In some example embodiments, the weight may be calculated based on the equation (2) as follows:

$$\omega_i = \frac{e}{e_i}. \quad (2)$$

As an example, $e_i$ may represent the color statistical information of the color information of the i-th sensor, and e may represent the merged color statistical information.

However, the calculation of the weight is not limited to equation (2). In some example embodiments, the weight $\omega_i$ may be further adjusted according to the actual white balance effect.

For example, in the actual white balance effect calibration, some scenes may be selected for debugging. The scenes selected for debugging may have corresponding target white balance gain coefficient. When there is a large difference between the white balance gain coefficient obtained according to equations (1) and (2) and the target white balance gain coefficient, the weight $w_i$ can be adjusted, so that the white balance gain coefficient calculated according to the adjusted weight $\omega_i'$ is closer to the target white balance gain coefficient. In an example, the adjusted weight $$\omega_i' = \frac{k_i \omega_i}{\sum k_i \omega_i},$$

where the adjustment coefficient $k_i$ may be a fixed coefficient. For example, $k_i$ may be calculated by Try Out method or other methods, such as Newton down-hill method, such that the difference between the calculated white balance gain coefficient and the target white balance gain coefficient is minimized. However, the above description is only exemplary, and the present invention is not limited thereto.

In some example embodiments, the merged color statistical information e may be calculated based on the equation (3) as follows:

$$\frac{1}{e} = \sum_{i=1}^{M} \frac{1}{e_i}. \quad (3)$$

The merged value of the color statistical information e may be characterized as a reciprocal of the sum of the reciprocals of the color statistical information $e_i$ of the plurality of sensors.

However, the calculation of the merged color statistical information is not limited to equation (3), and the color statistical information may also be merged by other merging algorithms.

The calculation method of the global color information in some example embodiments in which the color information is an n-dimensional vector (n is an integer greater than 1) is hereinafter described.

Assuming that the sensor unit 110 of the electronic device 100 includes M sensors, and n types of color information are obtained from the output of each sensor 110-1 to 110-M, the color information of an i-th sensor may be expressed as a n-dimensional color information vector as shown in equation (4):

$$X_i = (x_{i1}, x_{i2}, \ldots, x_{in})^T. \quad (4)$$

In equation (4), the superscript "T" indicates transpose of matrix. In the case where the color information is a multi-dimensional vector, the color statistical information of each sensor may be a color statistical information matrix. The color statistical information matrix represents a predetermined statistical value among different color information values of each sensor. For example, the color statistical information matrix $E_i$ corresponding to the n-dimensional color information vector of the i-th sensor may be expressed as:

$$E_i = \begin{bmatrix} e_{11i} & \cdots & e \\ \vdots & \ddots & \vdots \\ e_{n1i} & \cdots & e_{nni} \end{bmatrix}. \quad (5)$$

In equation (5), $e_{pgi}$ is the predetermined statistical value for the p-th color information value and the q-th color information value of the i-th color sensor.

In some example embodiments, the predetermined statistical value may be a covariance, and the color statistical information matrix may be a covariance matrix. For example, in the case where the color statistical information matrix is a covariance matrix, $e_{11i}$ is the variance of the first color information value of the i-th color sensor, and $e_{1ni}$ is covariance of the first color information value and the n-th color information value of the i-th color sensor.

In some example embodiments, in the case where the color information is an n-dimensional vector, the color information of different sensors may be weighted and merged using the weight corresponding the color information of each sensor based on the following equation (6), so as to obtain the global color information:

$$X = \sum_{i=1}^{M} W_i X_i. \quad (6)$$

Here, $X_i$ may represent the color information vector of the i-th sensor among the plurality of sensors, $W_i$ may represent the weight matrix corresponding to the color information vector $X_i$ of the i-th sensor, and X may represent the global color information vector.

In some example embodiments, the weight for the color information of each sensor may be inversely proportional to the color statistical information of the corresponding color information (for example, the color statistical information matrix), and directly proportional to the merged color statistical information (for example, a merged color statistical information matrix). Specifically, the weight in the weight matrix for the color information of each sensor may be inversely proportional to the corresponding element in the corresponding color statistical information matrix, and directly proportional to the corresponding element in the merged color statistical information matrix.

In some example embodiments, the weight matrix $W_i$ may be calculated based on the color statistical information matrix of the respective sensor, as shown in following equation (7):

$$W_i = E_i^{-1} E. \quad (7)$$

In equation (7), E may represent the merged color statistical information matrix.

However, the calculation of the weight matrix is not limited to equation (7). In some example embodiments, the weight matrix $W_i$ may be further adjusted according to the actual white balance effect.

For example, in the actual white balance effect calibration, some scenes may be selected for debugging. The scenes selected for debugging may have corresponding target white balance gain coefficient. When there is a large difference between the white balance gain coefficient obtained according to equations (6) and (7) and the target white balance gain coefficient, the weight matrix $W_i$ may be adjusted, so that the white balance gain coefficient calculated according to the adjusted weight matrix $W_i'$ is closer to the target white balance gain coefficient. However, the above description is only exemplary, and the present invention is not limited thereto.

In some example embodiments, the merged color statistical information matrix E may be calculated according to the equation (8) as follows:

$$E = \left( \sum_{j=1}^{M} E_j^{-1} \right)^{-1}. \quad (8)$$

The merged color statistical information E may be characterized as an inverse of a sum of inverses of color statistical information matrices of a color information vector.

However, the calculation of the merged color statistical information matrix is not limited to equation (8), and the color statistical information matrix may also be merged by other merging algorithms.

In step S240, the processor 120 calculates the white balance gain coefficient of each of the plurality of sensors using the global color information. Various general white balance algorithms in the prior art may be used, so as to obtain the white balance gain coefficient using the obtained global color information.

In an example embodiment, a look-up table may be used to calculate the white balance gain coefficient with the obtained global color information. For example, assuming that the obtained global color information is correlated color temperature, the mapping relationship between multiple correlated color temperature intervals and white balance gain coefficients may be established in advance in the form of a look-up table. The white balance gain coefficient corresponding to the global color information may be obtained using the lookup table after the global color information (i.e., correlated color temperature) is obtained.

In some example embodiments, the white balance gain coefficients may be calculated using various automatic white balance algorithms (such as automatic white balance algorithms based on gray world, perfect reflection, dynamic threshold, etc., automatic white balance algorithms based on color temperature and illuminance, and the like) based on global color information.

The following expressions (9) and (10) show examples of calculating white balance gain coefficients based on the global color information:

$$CCT_{test} \to \left( \frac{\overline{r_t}}{\overline{g_t}}, \frac{\overline{b_t}}{\overline{g_t}} \right) \quad (9)$$
$$CCT_{ref} \to \left( \frac{\overline{r_r}}{\overline{g_r}}, \frac{\overline{b_r}}{\overline{g_r}} \right), \text{ and}$$

$$K = \alpha \left( \frac{\overline{r_t}}{\overline{g_t}}, \frac{\overline{b_t}}{\overline{g_t}} \right) + (1-\alpha) \left( \frac{\overline{r_r}}{\overline{g_r}}, \frac{\overline{b_r}}{\overline{g_r}} \right). \quad (10)$$

In this example, the global color information (for example, the global color information X in equation (6) obtained based on equations (7) and (8)) required to calculate the white balance gain coefficient includes correlated color temperature and illuminance, wherein the correlated color temperature in the global color information is reflected in expression (9) (for example, $CCT_{test}$), and the illuminance in the global color information is reflected in expression (10) (for example, the illuminance may determine the value of the visual adaptation factor $\alpha$).

Expression (9) represents mapping from the global color information under the shooting environment (i.e., correlated color temperature $CCT_{test}$) to the gain coefficient, and mapping from the color information under the reference environment (i.e., the correlated color temperature $CCT_{ref}$, for example, 6500K) to the gain coefficient, and $\overline{r_t}$, $\overline{b_t}$, $\overline{g_t}$, $\overline{r_r}$, $\overline{b_r}$ and $\overline{g_r}$ represent the gain coefficients of the three channels R, B, and G under the shooting environment and the reference environment, respectively. For example, based on expression (9), $\overline{r_t}$, $\overline{b_t}$ and $\overline{g_t}$ may be obtained from the correlated color temperature $CCT_{test}$ in the obtained global color information, and $\overline{r_r}$, $\overline{b_r}$, $\overline{g_r}$ and $CCT_{ref}$ may be predetermined. Furthermore, the visual adaptation factor $\alpha$ can be obtained based on the illuminance in the global color information. Based on Expression (10), the white balance gain coefficient K can be calculated.

In order to make the automatic white balance synchronization algorithm more accurate, stable and smooth, the color information obtained may also be time filtered.

However, the above description is only exemplary, and the present invention is not limited thereto.

Figure 3:
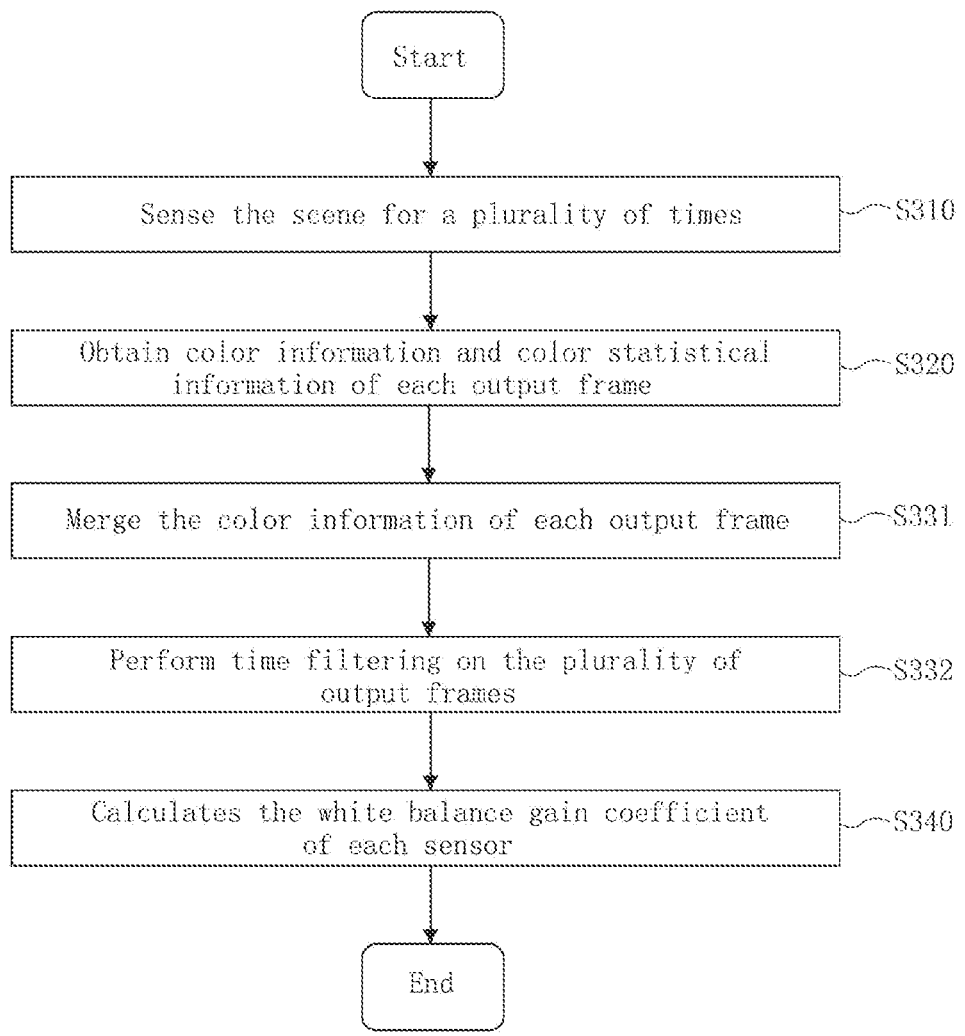
FIG. 3 illustrates a flowchart descriptive of a method of multi-sensor white balance synchronization according to embodiments of the inventive concepts.

FIG. 3 illustrates a flowchart descriptive of a method of multi-sensor white balance synchronization according to embodiments of the inventive concepts. The description of the method of multi-sensor white balance synchronization as follows is made with reference to the electronic device 100 of FIG. 1, but may be applied to electronic devices of various other configurations.

Referring to FIG. 3, in step S310, the plurality of sensors 110-1 to 110-M of the sensor unit 110 sense a same scene a plurality of times to obtain multiple output frames, with each output frame including outputs of the plurality of sensors obtained during each sensing. The processor 120 receives the plurality of output frames from the sensor unit 110.

In step S320, the processor 120 obtains the color information of the plurality of sensors 110-1 to 110-M and the color statistical information of the plurality of sensors 110-1 to 110-M from the outputs of the plurality of sensors in each output frame, as color information of each output frame and color statistical information of each output frame, respectively.

In step S331, the processor 120 merges the color information of each output frame, to obtain the global color information of each output frame. The merging performed by the processor 120 for the color information of each output frame may be the same as in step S220 described above with reference to FIG. 2 and detailed description repetitive of step 220 will be omitted for the sake of brevity.

In step S332, the processor 120 performs time filtering on the global color information of the plurality of output frames, to obtain global color information to be used for calculating the white balance gain coefficient. The global color information to be used for calculating the white balance gain coefficient may be determined as an output value of the time filtering of the last frame among the plurality of output frames.

Various time filtering methods may be used. In some example embodiments, a first-order filtering of infinite impulse response filtering (IIR) may be used. In this case, the output of the current frame is a weighted sum of the output of the previous frame and the global color information of the current frame.

The following equation (11) shows an example of IIR time filtering in the case where the color information is a one-dimensional vector:

$$x_F^k = \omega^{k-1} x_F^{k-1} + \omega^k x^k,$$

$$e_F^k = (\eta^{k-1}/e_F^{k-1} + \eta^k/e^k)^{-1} \quad (11).$$

In equation (11), the superscript k represents the sequence number of the frame, and the subscript "F" represents the time filtered signal (i.e., the time filtered global color information or the time filtered merged color statistical information). For example, $x^k$ and $e^k$ represent the global color information of the k-th frame and the merged color statistical information of the k-th frame, respectively, $x_F^k$ represents the filtered global color information of the k-th frame, and $e_F^k$ represents the filtered merged color statistical information of the k-th frame. $\omega$ and $\omega^{k-1}$ represent the filter weights of the kth frame and the (k−1)th frame, respectively, $\eta$ is the fading factor, and $\eta=0\sim1$.

The following equation (12) shows an example of calculating filter weights $\omega^k$ and $\omega^{k-1}$ based on color statistical information:

$$\omega^{k-1} = \frac{\eta^{k-1}/e_F^{k-1}}{\eta^{k-1}/e_F^{k-1} + \eta^k/e^k} \quad (12)$$

$$\omega^k = \frac{\eta^k/e^k}{\eta^{k-1}/e_F^{k-1} + \eta^k/e^k}.$$

However, the time filtering of step S332 for the case where the color information is a one-dimensional vector is not limited to equations (11) to (12), and in other embodiments the time filtering may be performed by other time filtering algorithms.

The example of time filtering when the color information is an n-dimensional vector is described hereinafter.

Assuming that the M sensors 110-1 to 110-M of the sensor unit 110 satisfy the Gaussian independent distribution, and the fading factor n belongs to an interval of [0, 1], the IIR time filtered color information vector and merged color statistical information matrix may be calculated according to equations (13) and (14).

$$X_F^k = W^{k-1} X_F^{k-1} + W^k X^k,$$

$$E_F^k = (\eta^{k-1}(E_F^{k-1})^{-1} + \eta^k(E^k)^{-1})^{-1}. \quad (13),$$

and $$W^{k-1} = \eta^{k-1}(E_F^{k-1})^{-1}[\eta^{k-1}(E_F^{k-1})^{-1} + \eta^k(E^k)^{-1}]^{-1} \ldots$$
$$= \eta^{k-1} E^k (\eta^{k-1} E^k + \eta^k E_F^{k-1})^{-1},$$

$$W_k = \eta^k(E^k)^{-1}[\eta^{k-1}(E_F^{k-1})^{-1} + \eta^k(E^k)^{-1}]^{-1} \ldots = \eta^k E_F^{k-1}(\eta^{k-1} E^k + \eta^k E_F^{k-1})^{-1}. \quad (14).$$

In equations (13) and (14), the superscript k represents the sequence number of the frame, and the subscript "F" represents the time filtered signal (i.e., the time filtered color information vector or the time filtered merged color statistical information matrix). For example, $X^k$ and $E^k$ represent the global color information vector and the merged color statistical information matrix of the k-th frame, respectively, $X_F^k$ represents the filtered global color information vector of the k-th frame, $E_F^k$ represents the filtered merged color statistical information matrix of the k-th frame, and $W^k$ represents the filter weight matrix of the kth frame.

However, the time filtering of step S332 for the case where the color information is an n-dimensional vector is not limited to equations (13) to (14), and in other embodiments the time filtering may be performed by other time-domain filtering algorithms.

In step S340, the processor 120 calculates the white balance gain coefficient of each sensor of the plurality of sensors using the global color information, which is the output value of the time filtering of the last frame of the plurality of output frames. Various general white balance algorithms in the prior art may be used, so as to obtain the white balance gain coefficient using the obtained global color information. In an example, a look-up table may be used to calculate the white balance gain coefficient with the obtained global color information. However, the above algorithms are exemplary, and the present invention is not limited thereto.

Time filtering combines the information of the plurality of frames, such that the automatic white balance synchronization algorithm is more accurate, stable and smooth.

Figure 4:
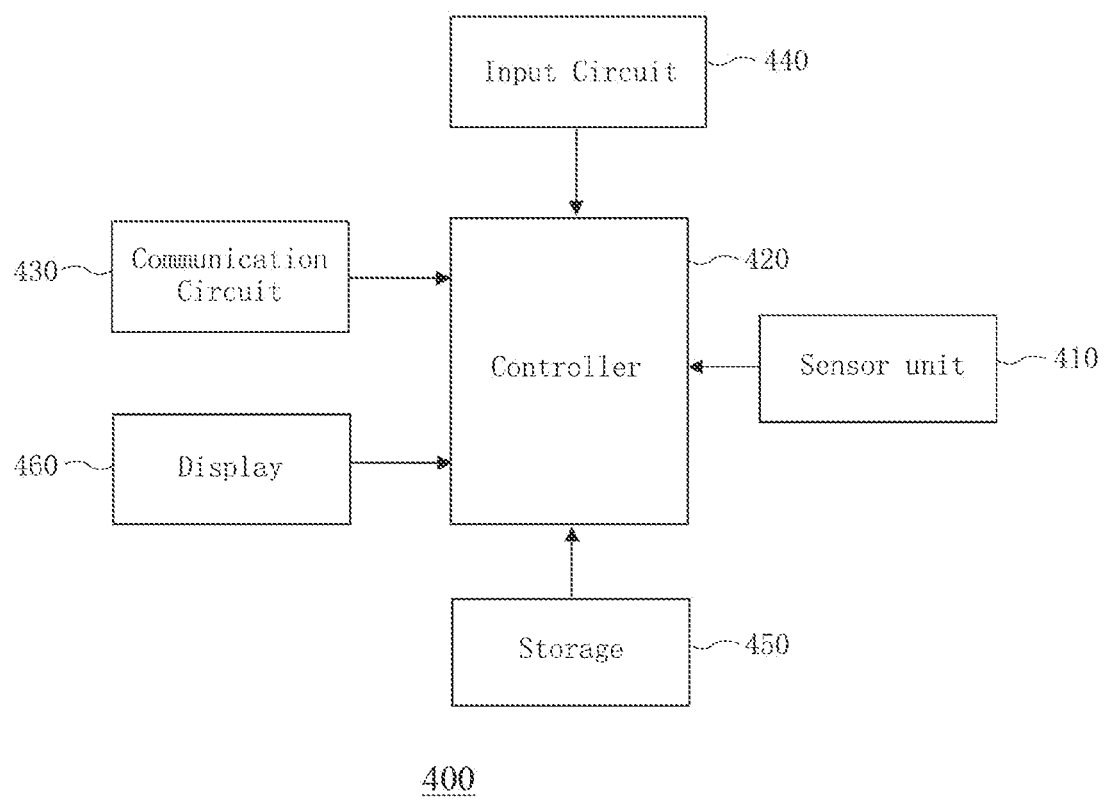
FIG. 4 illustrates a block diagram of a mobile terminal according to embodiments of the inventive concepts.

FIG. 4 illustrates a block diagram of a mobile terminal according to embodiments of the inventive concepts.

As shown in FIG. 4, the mobile terminal 400 according to some example embodiments includes a sensor unit (circuit) 410, a controller 420, a communication circuit 430, an input circuit 440, a storage 450, and a display 460. The mobile terminal 400 may include additional circuitry.

The sensor unit 410 is connected to the controller 420. The sensor unit 410 is used to sense the scene. The sensor unit 410 may for example be configured such as sensor unit 110 of FIG. 1 including a plurality of sensors 110-1 to 110-M. The controller 420 processes the signals sensed by the sensor unit 410 (for example, using the method for multi-sensor white balance synchronization shown in FIG. 2). The controller 420 may display the processed image on the display 460 and/or may store the image in the storage 450.

For example, sensor unit 410 may sense the scene using a plurality of sensors such as sensors 110-1 to 110-M in FIG. 1 to generate and output signals. Controller 420 may process the signals output by sensor unit 410 to adjust white balance using the white balance gain coefficients generated using the method for multi-sensor white balance synchronization described with respect to FIG. 2. Controller 420 may then generate an image having improved white balance based on the signals adjusted using the white balance gain coefficients. The image may be displayed on display 460 or stored in storage 450.

The communication circuit 430 may perform a communication operation for the mobile terminal with another terminal or a communication network. The communication circuit 430 may establish a communication channel to the another terminal or the communication network and/or may perform communication associated with, for example, an image processing.

The input circuit 440 may receive various input information and various control signals, and transmit the input information and control signals to the controller 420. The input unit 440 may be realized by various input devices such as keypads and/or keyboards, touch screens and/or styluses, etc., but is not limited thereto.

The storage 450 may include volatile memory and/or nonvolatile memory. The storage 450 may store various data generated and used by the mobile terminal. For example, the storage 450 may store an operating system and applications (e.g. applications associated with the method of inventive concepts) for controlling the operation of the mobile terminal. The controller 420 may control the overall operation of the mobile terminal and may control part or all of the internal elements of the mobile terminal. The controller 420 may for example be implemented as a general-purpose processor, an application processor (AP), an application specific integrated circuit, and/or a field programmable gate array, etc., but is not limited thereto.

The methods that perform the operations described in this application may be performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above may be written as computer programs, code segments, instructions or any combination thereof, for individually or collectively instructing or configuring the processor or computer to operate as a machine or special-purpose computer to perform the operations performed by the hardware components and the methods as described above. In one example, the instructions and/or software include machine code that is directly executed by the processor or computer, such as machine code produced by a compiler. In another example, the instructions or software include higher-level code that is executed by the processor or computer using an interpreter. Persons and/or programmers of ordinary skill in the art may readily write the instructions and/or software based on the block diagrams and the flow charts illustrated in the drawings and the corresponding descriptions in the specification, which disclose algorithms for performing the operations performed by the hardware components and the methods as described above.

For example, embodiments of the inventive concepts may include a non-transitory computer-readable storage medium for storing instructions executable by processor 120 of FIG. 1 for controlling electronic device 100 including sensor unit 110 having the plurality of sensors 110-1 to 110-M and the processor 100. The plurality of sensors 110-1 to 110-M may sense a same scene to obtain and provide a plurality of sensor outputs. The non-transitory computer-readable storage medium may include a first code segment stored for controlling (i.e., instructing) processor 120 to obtain color information of the plurality of sensors 110-1 to 110-M and color statistical information of the plurality of sensors 110-1 to 110-M based on the plurality of sensor output. The non-transitory computer-readable storage medium may include a second code segment for controlling (i.e., instructing) processor 120 to merge the color information of the plurality of sensors 110-1 to 110-M based on the color statistical information of the plurality of sensors 110-1 to 110-M to obtain global color information. The non-transitory computer-readable storage medium may include a third code segment for controlling (i.e., instructing) processor 120 to determine white balance gain coefficients of each of the plurality of sensors 110-1 to 110-M using the global color information. The non-transitory computer-readable storage medium may include a fourth code segment for controlling (i.e., instructing) processor 120 to generate an image having adjusted white balance based on the plurality of sensors and the white balance gain coefficients.

For example, embodiments of the inventive concepts may include a non-transitory computer-readable storage medium for storing instructions executable by controller 420 of FIG. 4 for controlling mobile terminal (device) 400 similar to the described above with respect to the non-transitory computer-readable storage medium described with respect to FIG. 1. In other embodiments, the non-transitory computer-readable storage medium may include additional code segments for controlling (i.e., instructing) processor 120/controller 420 to display the image on a display (e.g., display 460 of FIG. 4) and/or to store the image in memory (e.g., storage 450 of FIG. 4).

The instructions or software to control a processor or computer to implement the hardware components and perform the methods as described above, and any associated data, data files, and data structures, may be recorded, stored, or fixed in or on one or more non-transitory computer-readable storage media. Examples of a non-transitory computer-readable storage medium include at least one of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card or a micro card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer may execute the instructions.

While various example embodiments have been described, it should be apparent to one of ordinary skill in the art that various changes in form and detail may be made in these examples without departing from the spirit and scope of the claims and their equivalents.

What is claimed is:

1. A method of multi-sensor white balance synchronization comprising:
    sensing a same scene by a plurality of sensors of an imaging system to obtain and provide outputs of the plurality of sensors;
    obtaining, by a processor, color information of the plurality of sensors and color statistical information of the plurality of sensors from the outputs of the plurality of sensors;
    merging, by the processor, the color information of the plurality of sensors based on the color statistical information of the plurality of sensors, to obtain global color information;
    calculating, by the processor, white balance gain coefficients of each of the plurality of sensors using the global color information; and
    generating, by the processor, an image having adjusted white balance based on the outputs of the plurality of sensors and the white balance gain coefficients,
    wherein merging the color information of the plurality of sensors based on the color statistical information of the plurality of sensors comprises performing a weighted summation on the color information of the plurality of sensors based on the color statistical information of the plurality of sensors,
    wherein a weight for the color information of each sensor of the plurality of sensors is inversely proportional to the color statistical information of the color information, and is directly proportional to merged color statistical information, and
    wherein the merged color statistical information represents a merged value of the color statistical information of the plurality of sensors.

2. The method of multi-sensor white balance synchronization of claim 1, wherein the merged value of the color statistical information of the plurality of sensors is a reciprocal of a sum of reciprocals of the color statistical information of the plurality of sensors, or an inverse of a sum of inverses of color statistical information matrices of a color information vector.

3. The method of multi-sensor white balance synchronization of claim 1, wherein the color statistical information comprises a variance of the color information.

4. The method of multi-sensor white balance synchronization of claim 1, wherein the sensing the same scene by the plurality of sensors of the imaging system comprises sensing the same scene a plurality of times by the plurality of sensors of the imaging system to obtain multiple output frames, each output frame of the multiple output frames including outputs of the plurality of sensors obtained during each sensing,
    wherein the obtaining the color information of the plurality of sensors and the color statistical information of the plurality of sensors from the outputs of the plurality of sensors comprises obtaining the color information of the plurality of sensors and the color statistical information of the plurality of sensors from the outputs of the plurality of sensors in each output frame, as color information of each output frame and color statistical information of each output frame, respectively,
    wherein the merging the color information of the plurality of sensors based on the color statistical information to obtain the global color information comprises
        merging of the color information of each output frame to obtain global color information of each output frame, and
        performing time filtering on the global color information of each output frame, to obtain global color information for calculating the white balance gain coefficients, and
    wherein time filtered global color information of a last frame from among the multiple output frames is used as the global color information for calculating the white balance gain coefficients.

5. The method of multi-sensor white balance synchronization of claim 1, wherein the color information is color-related information for white balance calculation, and types of color information respectively obtained from the outputs of the plurality of sensors are the same.

6. The method of multi-sensor white balance synchronization of claim 1, wherein the color information comprises at least one of correlated color temperature, brightness, illuminance, and spectral power distribution.

7. The method of multi-sensor white balance synchronization of claim 1, wherein the plurality of sensors include a first type of sensor and a second type of sensor different from the first type of sensor,
    wherein the first type of sensor is an image sensor, and an output of the first type of sensor is an image, and
    wherein the second type of sensor is a color sensor, and an output of the second type of sensor includes at least one of correlated color temperature, brightness, illuminance, and spectral power distribution.

8. An electronic device comprising:
    a plurality of sensors configured to sense a same scene to obtain and provide a plurality of sensor outputs; and
    a processor configured to obtain color information of the plurality of sensors and color statistical information of the plurality of sensors based on the plurality of sensor outputs, merge the color information of the plurality of sensors based on the color statistical information of the plurality of sensors to obtain global color information, determine white balance gain coefficients of each of the plurality of sensors using the global color information, and generate an image having adjusted white balance based on the plurality of sensor outputs and the white balance gain coefficients,
    wherein the processor is configured to merge the color information of the plurality of sensors by performing a weighted summation on the color information of the plurality of sensors based on the color statistical information of the plurality of sensors,
wherein a weight for the color information of each sensor of the plurality of sensors is inversely proportional to the color statistical information of the color information, and is directly proportional to merged color statistical information, and
wherein the merged color statistical information represents a merged value of the color statistical information of the plurality of sensors.

9. The electronic device of claim 8, wherein the merged value of the color statistical information of the plurality of sensors is a reciprocal of a sum of reciprocals of the color statistical information of the plurality of sensors, or an inverse of a sum of inverses of color statistical information matrices of a color information vector.

10. The electronic device of claim 8, wherein the color statistical information comprises a variance of the color information.

11. The electronic device of claim 8, wherein the plurality of sensors are configured to sense the same scene a plurality of times to obtain multiple output frames, each output frame of the multiple output frames including outputs of the plurality of sensors obtained during each sensing,
wherein the processor is configured to obtain the color information and the color statistical information by obtaining the color information of the plurality of sensors and the color statistical information of the plurality of sensors from the plurality of sensor outputs of the plurality of sensors in each output frame as color information of each output frame and color statistical information of each output frame, respectively,
wherein the processor is configured to merge the color information by
  merging of the color information of each output frame to obtain global color information of each output frame, and
  performing time filtering on the global color information of each output frame, to obtain global color information for determining the white balance gain coefficient, and
wherein time filtered global color information of a last frame from among the multiple output frames is used as the global color information for determining the white balance gain coefficients.

12. The electronic device of claim 8, wherein the color information is color-related information for white balance determination, and types of color information respectively obtained from the plurality of sensor outputs are the same.

13. The electronic device of claim 8, wherein the color information comprises at least one of correlated color temperature, brightness, illuminance, and spectral power distribution.

14. The electronic device of claim 8, wherein the plurality of sensors include a first type of sensor and a second type of sensor different from the first type of sensor,
wherein the first type of sensor is an image sensor, and a sensor output of the first type of sensor is an image, and
wherein the second type of sensor is a color sensor, and a sensor output of the second type of sensor includes at least one of correlated color temperature, brightness, illuminance, and spectral power distribution.

15. The electronic device of claim 8, further comprising a display configured to display the image, the electronic device configured as a mobile device.

16. The electronic device of claim 8, further comprising a memory configured to store the image, the electronic device configured as a mobile device.

17. A non-transitory computer-readable storage medium for storing instructions executable by a processor for controlling an electronic device including a plurality of sensors and the processor, the plurality of sensors configured to sense a same scene to obtain and provide a plurality of sensor outputs, the non-transitory computer-readable storage medium comprising:
  a first instruction for obtaining color information of the plurality of sensors and color statistical information of the plurality of sensors based on the plurality of sensor outputs;
  a second instruction for merging the color information of the plurality of sensors based on the color statistical information of the plurality of sensors to obtain global color information;
  a third instruction for determining white balance gain coefficients of each of the plurality of sensors using the global color information; and
  a fourth instruction for generating an image having adjusted white balance based on the plurality of sensors and the white balance gain coefficients,
wherein merging the color information of the plurality of sensors based on the color statistical information of the plurality of sensors comprises performing a weighted summation on the color information of the plurality of sensors based on the color statistical information of the plurality of sensors,
wherein a weight for the color information of each sensor of the plurality of sensors is inversely proportional to the color statistical information of the color information, and is directly proportional to merged color statistical information, and
wherein the merged color statistical information represents a merged value of the color statistical information of the plurality of sensors.

* * * * *